United States Patent
Sharon

[11] 3,955,415
[45] May 11, 1976

[54] FLOWMETER

[75] Inventor: Benjamin Sharon, Rehovot, Israel

[73] Assignee: Yeda Research & Development Co. Ltd., Rehovot, Israel

[22] Filed: Mar. 3, 1975

[21] Appl. No.: 555,173

[30] Foreign Application Priority Data
Mar. 8, 1974  Israel.................................... 44374

[52] U.S. Cl. ............................................. 73/228
[51] Int. Cl.² ........................................ G01F 1/28
[58] Field of Search.................... 73/228; 116/117 C

[56] References Cited
UNITED STATES PATENTS

| | | | |
|---|---|---|---|
| 1,401,887 | 12/1921 | Davis ..................... | 73/228 |
| 1,712,761 | 5/1929 | Farnivall et al. ......... | 73/228 |
| 2,889,707 | 6/1959 | Snider.................... | 73/228 |
| 2,892,348 | 6/1959 | Ekstrom, Jr. ............ | 73/228 |
| 3,857,277 | 12/1974 | Moore .................... | 73/228 X |

*Primary Examiner*—Jerry W. Myracle
*Attorney, Agent, or Firm*—Browdy and Neimark

[57] ABSTRACT

A flowmeter for the quantitative measurement of small rates of flow of fluids (liquids and gases), comprising a hermetically sealed housing having two parallel walls, at least one of these being transparent, a scale being provided on said transparent wall, a thin flexible resilient vane attached by one of its ends to a sidewall of the housing so as to divide the inner space into two parts, inlet means for the fluid being provided in sidewall connected to one of these parts, outlet means being provided in a sidewall of the other part, the flexible vane having an area protruding into the inner space of the housing equal to essentially the inner cross-section of the housing at the position of the vane when no fluid is flowing. Preferred shapes of the housing are (in side view) a semi-circle, half an ellipse or a triangle.

6 Claims, 4 Drawing Figures

U.S. Patent   May 11, 1976   3,955,415
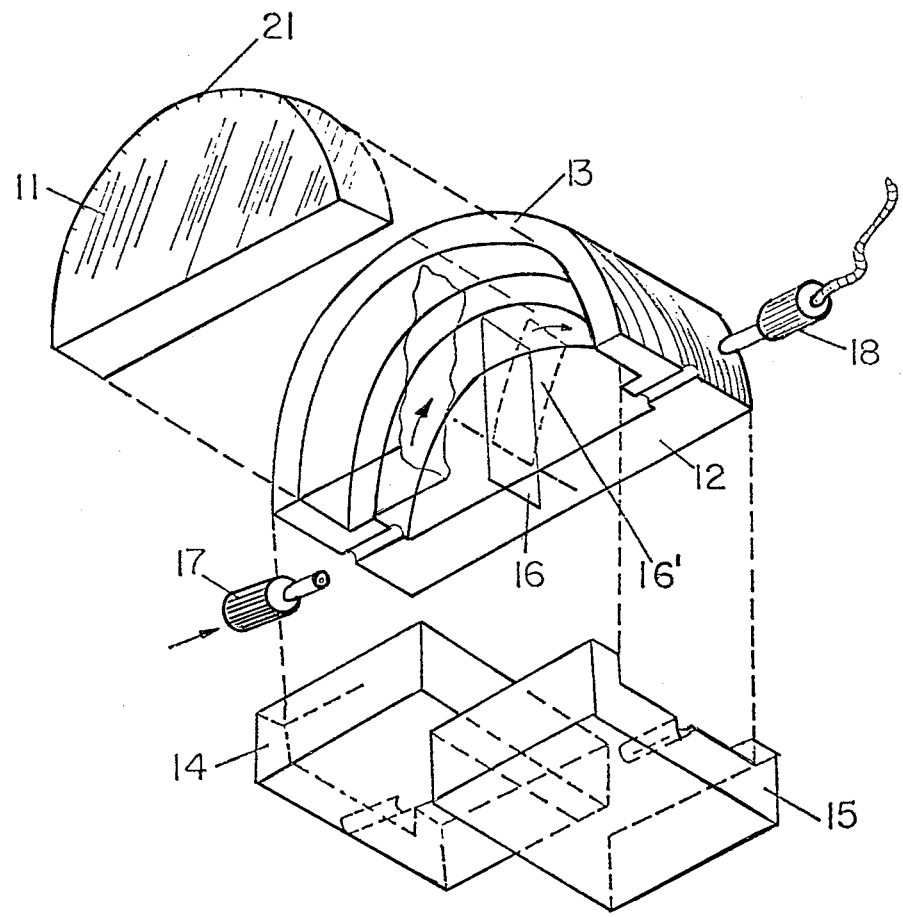
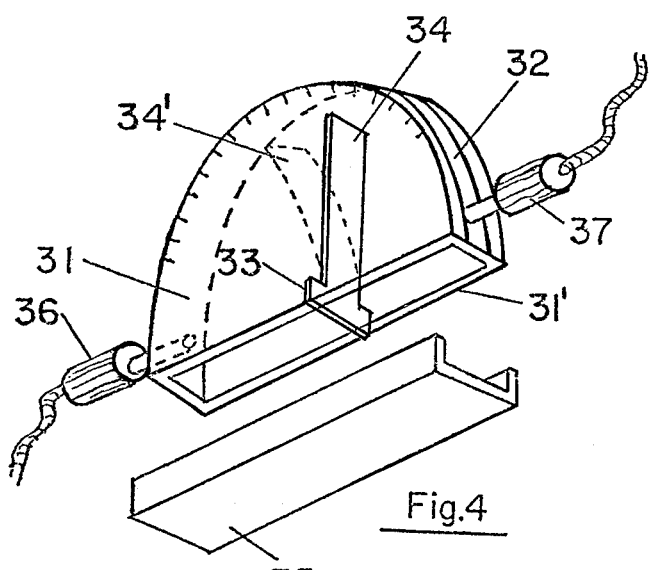
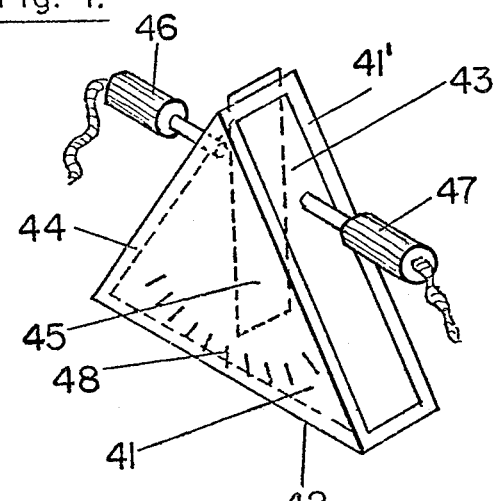
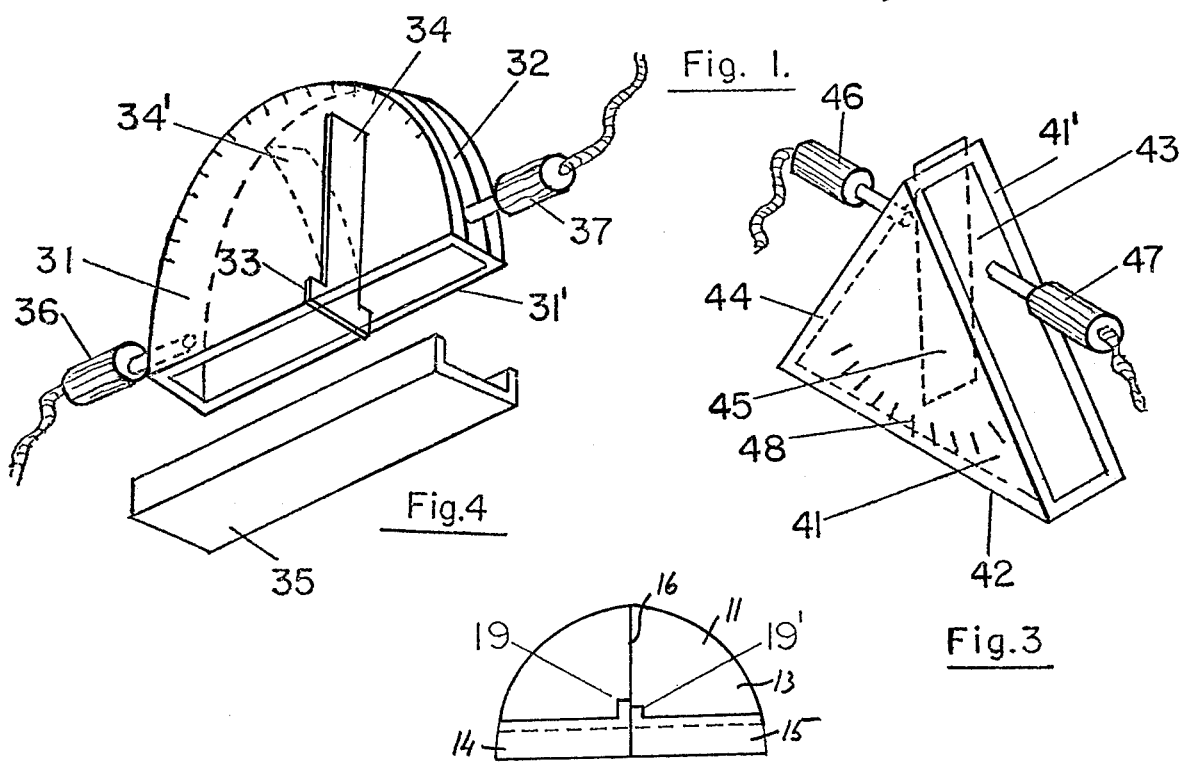
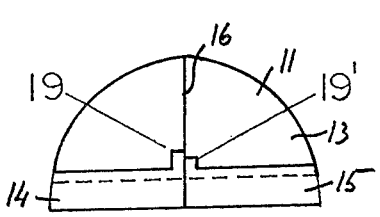
Fig. 1.
Fig. 4.
Fig. 3.
Fig. 2.

FLOWMETER

BACKGROUND OF THE INVENTION

The invention relates to a novel flowmeter for the measurement of small rates of flow of fluids (liquids and gases). The sensitivity and range of measurement varies with the dimensions of the flowmeter, but small models of about 15 mm radius, are adapted to measure flows of liquids of from about 1 ml per minute to about 200 ml of liquid.

The novel flowmeters are of use in various fields of science and technology, and especially in medical technology where low rates of flow are to be measured, such as of infusions of liquids to human patients.

The novel flowmeter is of very simple construction and it is inexpensive. It can be produced as a disposable item for one-time use, in medical and other applications.

PRIOR ART

Numerous types of flowmeters are known, but most of these are not sensitive enough for the measurement of small rates of flow. Some, as for example rotameters, are suited for such small quantities, but these are rather expensive and furthermore they must be maintained in a vertical position during the measurement. Amongst flowmeters of interest in connection with the present invention are area-type flowmeters, in which the area of restriction is varied to give a relatively constant pressure differential. The flow rate is a function of the area measurement. Amongst meters of this type there may be mentioned rotameters and piston-type meters. Another type of interest is that of positive-displacement meters wherein a fixed quantity of fluid will produce a given motion of a piston or vane, which through some registering device indicates or registers the quantity of flow. The novel meter according to the present invention is based on a combination of the principles of these types, but it is of specific construction so as to be adapted to the specific intended manners of use.

Infusions are given to human patients at rates of flow which generally vary from about one liter of liquid per eight hours to about one liter of liquid per half an hour. Such comparatively low rates of liquid flow are a serious problem as regards conventional flowmeters. These difficulties are overcome by the novel flowmeters of the present invention.

SUMMARY OF THE PRESENT INVENTION

A flowmeter for the quantitative measurement of small rates of flow of fluids (liquids and gases), comprising a hermetically sealed housing having two parallel walls, at least one of these being transparent, a scale being provided on said transparent wall, a thin flexible resilient vane attached by one of its ends to a sidewall of the housing so as to divide the inner space into two parts, inlet means for the fluid being provided in a sidewall connected to one of these parts, outlet means being provided in a sidewall of the other part, the flexible vane having an area protruding into the inner space of the housing equal to essentially the inner cross-section of the housing at the position of the vane when no fluid is flowing. Preferred shapes of the housing are (in side view) a semi-circle and half an ellipse.

A further embodiment of the invention has a triangular shape, the triangle being substantially bisected by the vane which extends from one apex to the middle of the opposite side of the triangle. This embodiment makes possible the measurement of a wider range of flow rates, as the deflection of the vane by fluids passing through the flowmeter opens up a comparatively larger free space at the free end of the vane.

A preferred embodiment of a flowmeter according to the present invention comprises a semi-circular housing provided with an inlet tube and with an outlet tube for the fluid to be measured, a vane of resilient plastic material positioned about the median line of the semi-circular housing and attached to the housing at one of its ends, the area of the vane being substantially equal to the cross-section of said housing at its rest position. Suitable materials for such vanes are polystyrene, polypropylene, Mylar (T.M.), Crepton (T.M.), and the like. The said vane is deflected by the flow of the fluid and a graduation or scale provided on the said housing makes it possible to read off the rate of flow. Vanes of about 0.1 mm to about 0.04 mm thickness gave good results. Advantageously, the said vane is pivotally arranged about a pivot displaced respective the center of the semi-circular housing, thus resulting in a turning radius resulting in an opening up of varying areas between the upper edge of the vane and the housing for varying rates of flow. The provision of a non-symmetrical protrusion at the center of the housing where the vane is attached serves as varying pivot for the movement of the vane in either of the two directions of flow, combined with the possibility to change the direction of flow through the flowmeter, makes it possible to use the meter for the measurement of a comparatively wide range of rates of flow. With thin (about 0.01 mm to 0.04 mm thickness), resilient vanes a measurable deflection of the vane is caused by a pressure difference of less than 1 mm Hg. Due to the elasticity and low inertia of the vane, its deflection does not depend on the position of the meter. The flowmeter is not affected in an appreciable manner by vibrations and by normal movements which take place when a person is transported from place to place.

The invention is illustrated with reference to the enclosed schematical drawing which is not according to scale, and in which:

FIG. 1 is a schematical exploded view of a flowmeter according to the invention;

FIG. 2 is a schematical side view illustrating the pivot of a flowmeter of the type shown in FIG. 1;

FIG. 4 is an exploded side view of another semi-circular flowmeter according to the invention;

FIG. 3 is a perspective view of another flowmeter of the invention, of triangular shape.

The flowmeters illustrated with reference to FIGS. 1 and 2 comprises a housing consisting of two semi-circular members 11 and 12, a curved sidewall member 13 of semi-circular shape, two rectangular members 14 and 15 which serve as base of the meter, a resilient vane 16, an inlet tube 17 and an outlet tube 18, a pivot 19 being provided about which the vane 16 turns. The rectangular members 14 and 15 of the housing of FIG. 1, or the pivots 19 and 19' of FIG. 2 hold the vane in such a position that it turns about a pivot which is smaller than the radius of the housing. This radius is different for each of the two possible directions of movement of the vane.

The direction of flow in one of the two possible directions is shown in FIG. 1. In this case the vane is deflected to the right-hand side as shown by the dotted vane 16', and the rate of flow is indicated on the scale 21. As the vane moves to the right, an increasing area is opened between the upper edge of the rectangular vane and the curved part of the housing. When the direction of flow is reversed, the stopping member 19 shown in FIG. 2 becomes the pivot of the vane 16, and it is clear that in this case larger rates of flow can be measured by the meter. In this case the free space at the upper end between the vane and the housing is larger and its rate of increase is more rapid than in the other direction. Thus, the novel meter has some of the characteristics of variable-area meters, and some of deflection type meters. Resilient materials such as Mylar (T.M.) and Crepton (T.M.) are comparatively inert and retain their resilience over prolonged periods of time without deterioration when used as vanes.

A meter according to the present invention may be constructed from transparent colorless plastic (methylmethacrylate), the radius of the semi-circle being about 15 mm, the distance between the two plates 11 and 12 being about 3 mm, diameter of inlet and outlet tubes 2 mm, vane of Mylar (T.M.) of 0.025 mm thickness. The protrusions defining the pivot were displaced upward respective the radius by 1 mm and 3 mm, respectively. Liquid flows of about 2.5 ml to about 50 ml per minute could be measured with an accuracy of about 10–15%. Vane size: 2.9 mm times 14.5 mm. The housing may also be built of polystyrene.

According to a further embodiment, a flowmeter can be constructed as shown in FIG. 4. The meter comprises in combination a semi-circular housing, which comprises two semi-circular members 31 and 31' spaced apart at a fixed distance from each other by the curved semi-circular member 32, rigidly connected with both members 31 and 31'. A narrow slot 33 is provided at the center of members 31 and 31' and into this there is inserted lower and wider part of the T-shaped vane 34, made of a thin, flexible resilient material, as set out above. This fits into this slot 33 in a tight fit, so that the lower part of the "T" is held in the slot, while the elongated part of the T protrudes into the free space above. After the insertion of the member 34 into the slot 33, the housing of the flowmeter is closed by means of the tight-fitting channel-formed member 35. The flowmeter is provided with an inlet tube 36 and with an outlet tube 37. When a fluid flows through the meter, the vane 34 is deflected, and the deflection is measured on the scale 38. A certain deflected position of vane 34 is shown by the position 34'.

Good results may be obtained with vanes of polystyrene or polypropylene of about 0.01 mm to 0.03 mm thickness. Gas flows of from 18 ml/minute to about 200 ml/minute can be measured with a meter of the size set out above (radius of semi-circle of about 15 mm; internal distance about 3 mm).

The housing of the flowmeter may be semi-circular as set out above. It may be advantageously in the form of half an ellipse. Other geometrical forms may be used as well. For example, there may be constructed a meter having a triangular housing, as shown schematically in FIG. 3. In this figure the housing is similar, but it comprises two triangular members 41 and 41', spaced apart at a fixed distance by means of three rectangular members 42, 43, and 44. The vane 45 is inserted through a slot, not shown, at the apex, there being provided inlet means 46 and outlet means 47 connected to the free inner space of the meter, for the fluid to be measured. The deflection of the vane is measured on scale 48, which is graduated at known flow rates.

It is clear that the novel flowmeter can be used with liquids and with gases which flow through the meter. It can be made in various sizes and thus widely varying rates of flow may be measured.

Flowmeters according to the invention can be used for various measurements of rates of flows of liquids and of gases in laboratories, in industry and also in medical instruments, such as for example with infusions, anaesthesia, etc., which flow through the meter.

It is clear that the above description is by way of example only and that various modifications and changes in the nature and arrangement of parts may be resorted to without departing from the scope and spirit of the invention.

I claim:

1. A flowmeter for the quantitative measurement of small rates of flow of fluids flowing through the flowmeter, comprising:
    a hermetically sealed housing having two parallel walls facing each other, at least one of these being transparent;
    a scale being provided on a transparent wall;
    a thin vane made of flexible, resilient material positioned so as to divide the said housing into two parts, one end of said vane being non-rotatably attached to the housing;
    inlet means being provided in a sidewall of one of these parts; and
    outlet means being provided in a sidewall of the other part of the housing;
    said vane being of an area substantially equal to the cross-section of the housing where said vane is located in its rest position,
    whereby the rate of flow is indicated by the deflection of the edge of the flexible vane due to the bending thereof in the fluid flow.

2. A flowmeter according to claim 1, wherein the housing is of semi-circular shape, the length of vane being slightly less than the radius and its width being about the distance between the two semi-circular walls.

3. A flowmeter according to claim 1, wherein the walls of the housing have the shape of half an ellipse.

4. A flowmeter according to claim 1, wherein the housing is of triangular shape, a flexible vane extending from the apex of the triangle to about the middle of the opposite side of the triangle, inlet and outlet being provided in sidewalls defining the sides adjacent said apex.

5. A flowmeter according to claim 1, wherein the vane is pivoted about a pivot displaced respective the center of the side of the housing to which it is attached.

6. A flowmeter according to claim 1, comprising two different pivots, one for each of the two possible directions of flow through the flowmeter, and two differently calibrated scales, so as to make possible the measurement of two varying ranges of flow through the meter.

* * * * *